G. CALVI.
FELTING MACHINE.
APPLICATION FILED DEC. 11, 1908.

1,069,850.

Patented Aug. 12, 1913.
7 SHEETS—SHEET 1.

Witnesses.
Janet M. Wynkoop
C. B. Melton

Inventor.
Giuseppe Calvi,
Knight Bros.
Attorneys.

G. CALVI.
FELTING MACHINE.
APPLICATION FILED DEC. 11, 1908.

1,069,850.

Patented Aug. 12, 1913.
7 SHEETS—SHEET 2.

Witnesses.
Janet M. Wynkoop,
C. B. Melton.

Inventor:
Giuseppe Calvi,
Knight Bros
Attorneys.

G. CALVI.
FELTING MACHINE.
APPLICATION FILED DEC. 11, 1908.

1,069,850.

Patented Aug. 12, 1913.
7 SHEETS—SHEET 6.

Fig. 7.ª

Witnesses.
Janet M. Wynkoop,
C. B. Melton.

Inventor:
Giuseppe Calvi
Knight Bros
Attorneys.

UNITED STATES PATENT OFFICE.

GIUSEPPE CALVI, OF ALESSANDRIA, ITALY, ASSIGNOR TO BORSALINO GIUSEPPE & FRATELLO-SOCIETA ANONIMA, OF ALESSANDRIA, ITALY, A CORPORATION OF ITALY.

FELTING-MACHINE.

1,069,850.   Specification of Letters Patent.   Patented Aug. 12, 1913.

Application filed December 11, 1908. Serial No. 467,081.

*To all whom it may concern:*

Be it known that I, GIUSEPPE CALVI, mechanic, subject of the King of Italy, residing at No. 2 Via Argui, Alessandria, in the Kingdom of Italy, have invented new and useful Improvements in or Relating to Felting-Machines, of which the following is a specification.

The object of the improvements forming the subject of this invention is to make the working of felting machines more economical and uniform as regards the consumption of hairs as well as the consumption of power.

Figure 3:
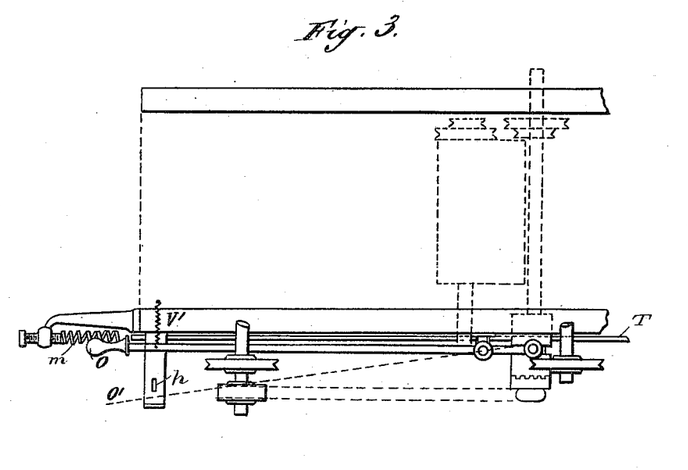
Fig. 3 is a plan of the driving parts of the machine.
Figure 4:
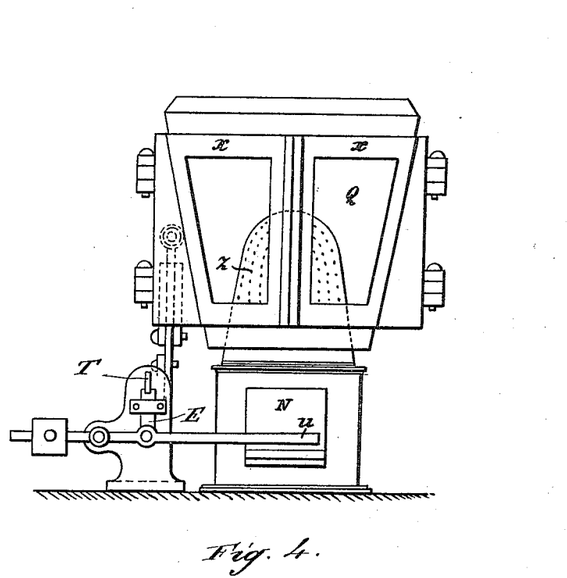
Fig. 4 is a front elevation of the end of the machine and Figs. 5$^a$ and 5$^b$ together make a side elevation of the whole of the same machine, and Fig. 5$^c$ is an end view of Fig. 2 on a smaller scale.
Figure 5A:
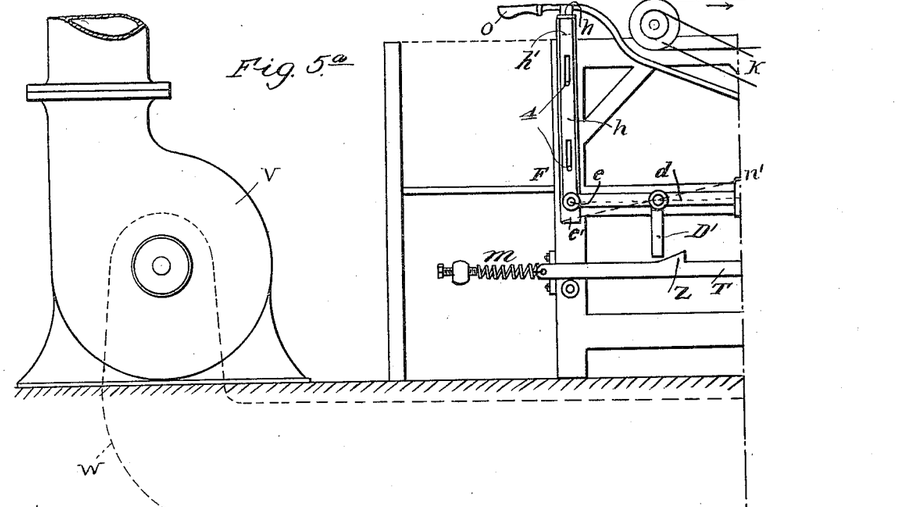
Figure 5B:
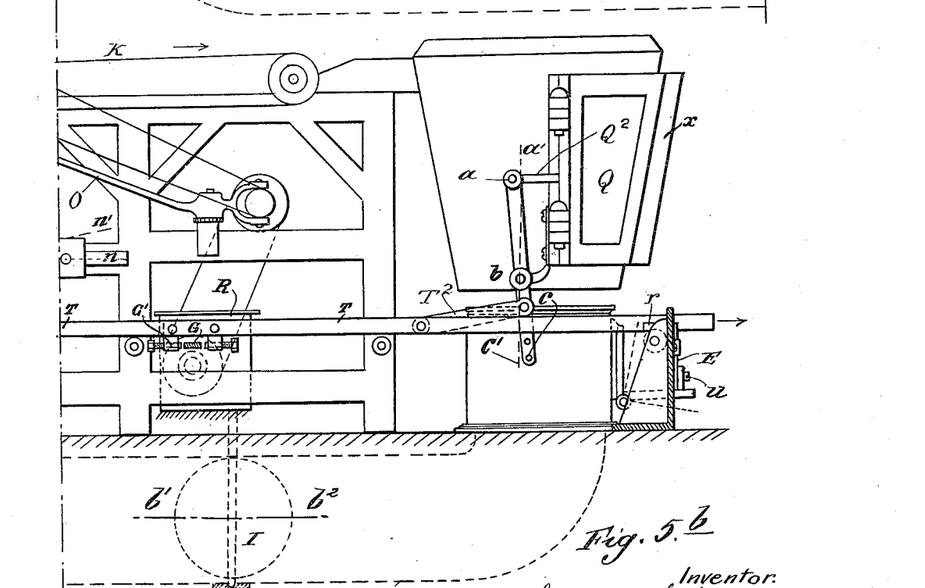

In order to explain more clearly what these improvements consist in, it is advisable to consider the method of working of felting machines generally. The felting machine is generally attended to by three operators two of whom work in front of the machine near the doors $x$ (Figure 4) for removing and replacing the cone $z$, and the third stands on the floor F (Fig. 5$^a$) within reach of an endless band which can be started and stopped by means of a handle O (Figs. 3, 5$^a$ and 5$^b$). The third operator has to distribute a certain quantity of hairs upon the endless band for felting the hat, and also to regulate their fall into the chamber Q (Fig. 4) after the first operator has introduced into it the cone provided with very fine holes, to which the hairs have to adhere. When the cone is covered with the desired quantity of hairs, the first operator opens the doors $x$ (Fig. 4), allows a shower of water to fall on the felting, operates with his foot the valve N (Fig. 4), for the purpose of reducing the quantity of air passing through the cone, and of avoiding excessively quick evaporation of water, and finally withdraws the cone from the chamber Q replacing it by another cone prepared beforehand. It will be readily understood that the third operator must take care that the hairs do not begin to fall into the chamber Q before the form or cone $z$ has been introduced into it, for otherwise a considerable quantity of hairs would be drawn in by the fan V (Fig. 5$^a$) and projected outside, and obviously the material that would be lost, would be the finest and lightest. The two operations, (introducing hairs into the chamber and inserting the cone in place) ought to take place at the same moment.

In ordinary felting machines the fan V (Fig. 5) works with throttled suction when the form or cone $z$ covered by the felting is in the chamber Q, and with full suction when the cone is removed. Obviously in the latter case, the quantity of air used is enormously greater than that when air is forced to pass through the felting. This increase of the quantity of air brings about an increase of the power absorbed which is considerable, sometimes amounting to 7 H. P. and it might bring about the slipping of the driving belt. There is, therefore, both irregularity in working and waste of power. These disadvantages as well as those mentioned before, are obviated by the adoption of the devices forming the subject matter of this invention, the application of which to felting machines is illustrated in the accompanying drawings.

Figs. 6$^a$ and 6$^b$ are a lateral section on line C—D of Figs. 7$^a$ and 7$^b$ and Figs. 7$^a$ and 7$^b$ together make a horizontal section of line A—B of Figs. 6$^a$ and 6$^b$ of another construction of the felting machine according to this invention.

According to this invention, the felting machine is provided with a regulator or governor R (see Fig. 5$^b$, sectional plan Fig. 1 and side elevation Fig. 2) operating a butterfly valve I arranged in the suction pipe W of the fan V. It is obvious that the shape of the closing part can be any desired, for instance instead of a butterfly valve a single or double sluice valve, a series of pivoted blades, etc., could be used.

In the construction illustrated in the drawing, the casing of the regulator R contains the spindle B carrying a worm (Fig. 1) engaging with a toothed sector A, on the spindle of rotation of which is mounted the valve I. The bearing bracket C (Figs. 1 and 2) provided with a suitable means of adjustment, is capable of oscillating about the pivot P, so as to enable the spindle B to pass from the position of engagement to the position in which the worm is entirely disengaged from the sector A. The other end of the spindle B runs in a bearing D. A lever G secured to the pivoted bearing bracket C and capable of rotating with the same about the pivot P, occupies the position shown when the worm spindle B is in the engaged position. When it passes into the position G' (see Figs. 5$^c$ and 1) destroying the engagement between the worm and the toothed sector, it carries with it also the bearing D by means of the pivot S and moving it along in the guide N'' N''. The movement in question, however, does not prevent the spindle B from continuing to rotate. The engagement and the disengagement are controlled by the rod T (Figs. 5$^a$ 5$^b$) which causes the lever G to pass from the position shown to the position G' Fig. 5$^c$ and vice-versa, and consequently the sector A from the engaged position to the position of rest, or vice versa.

Figure 1:
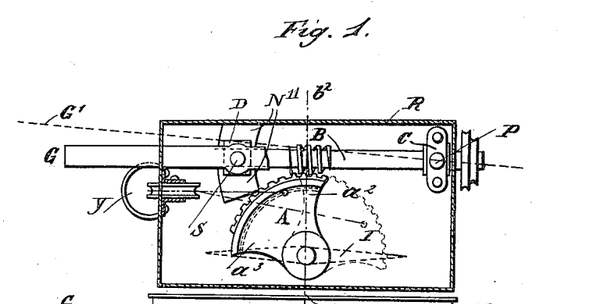
Figs. 1 and 2 show respectively in horizontal section and side elevation a regulating device applied to the felting machine in accordance with this invention.
Figure 2:
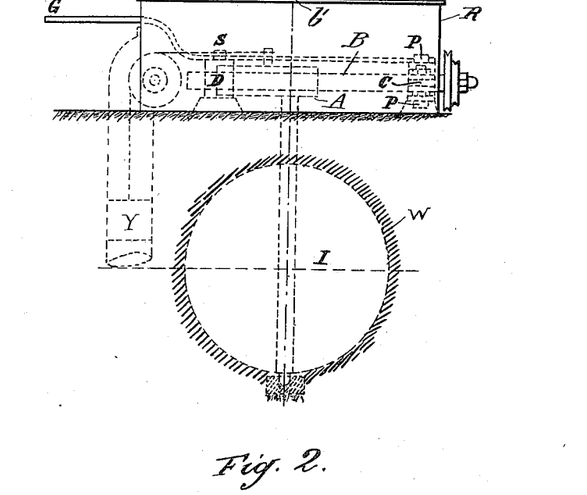

In Figs. 1 and 2 the butterfly valve is completely closing the suction pipe $w$ of the fan V while in Figs. 5$^a$ and 5$^b$ it leaves the said pipe completely open.

When it is desired to pass from the position of closing (as in Fig. 2) to that of opening (as in Figs. 5$^a$ and 5$^b$) it is sufficient to move the rod T, so as to bring the lever from G' to G. The spindle B which is continuously rotating then drives the sector A by means of the worm, so as to bring the point $a^3$ to $a^2$. In that position the central plane of the valve is arranged along $b^1$ $b^2$ and remains in the open position because the last tooth on the segment will then remain in mesh with the right hand end of the worm thread. If is it desired to bring the valve I back to its original position, it is sufficient to shift the rod T to position G$^1$. The sector is then disengaged and under the action of the weight $y$ (Figs. 1 and 2) immediately returns to its original or closing position.

Each time the operator replaces the form or cone in the chamber Q, he must open and close the doors $x$. In closing the doors he makes two important operations. When he closes the doors one of the latter operates a lever $a$ $c$ pivoted about $b$ (Fig. 5$^b$) by means of a link Q$^2$ abutting against the back of the door and forces it to pass from the position $a^1$ $c^1$ to the position $a$ $c$. The said lever being connected with the rod T by means of a link T$^2$ forces it to move forward in the direction of the arrow, causing the lever G to move into the position shown in Fig. 1, the result of which is to bring the worm B into engagement with the sector A, and thus bring the valve I into the open position. But at the same time another important movement takes place. The rod T (Figs. 5$^a$ and 5$^b$) is provided with a tooth Z which, on moving into the position indicated in Fig. 5$^a$, operates the stop or tappet D$^1$ of the lever $d$ which then moves from the position $e$ $n$ into the position $e^1$ $n^1$. Owing to the said movement the slide bar hinged to $d$ at $e$ is pulled downwardly when its top end drops to $h^1$. The handle O (Fig. 3) which the attendant shifted over to O$^1$ and which was held in that position by the slide bar $h$ (Fig. 5$^a$), can return to the position O under the action of the spring V$^1$ (Fig. 3) thereby starting the conveyer. The eye, at $e$, must have a certain play around the journal so as not to interfere with the rectilinear movement of the slide bar $h$, guided by the pins 4, when the lever $d$ is oscillated around its center. In that way, the movement in the directioon of the arrows Figs. 5$^a$ 5$^b$ of the endless band K takes place immediately after the closing of the doors $x$ (Fig. 5$^b$).

The time taken by the valve of the regulator or governor R for completely opening the valve I can be regulated by modifying the speed of rotation of the spindle B, and in that way a valve I could be completely opened exactly at the moment when the workman sprinkles the felting form, that is to say at the moment when the maximum suction is required.

In the machines hitherto used, when the workman has sprinkled the felt and wants to withdraw the cone in order to put in another one, he has to open the valve N with his foot (Fig. 4) for the purpose of reducing the passage of air through the felting. According to this invention, on the contrary, the workman has at that moment merely to exercise a pressure with his foot on pedal $u$ (Fig. 4), for in that case the valve I is automatically closed, as the pedal $u$, during its descent, draws down the part E (Fig. 5$^b$) out of the recess $r$ releasing the rod T. The latter, under the influence of the action of the spring $m$ (Fig. 5$^a$), comes back and brings the lever G to the position G$^1$ (Figs. 5$^b$ and 5$^c$) and disengages the worm B from the sector A (Fig. 1) which results in the valve I being brought back to the closing position (Figs. 1 and 2) under the influence of the action of the balance weight $y$. Upon the door $x$ being closed (Fig. 5$^b$) the valve is opened again, and the endless band restarted.

Figures 5C, 6B:
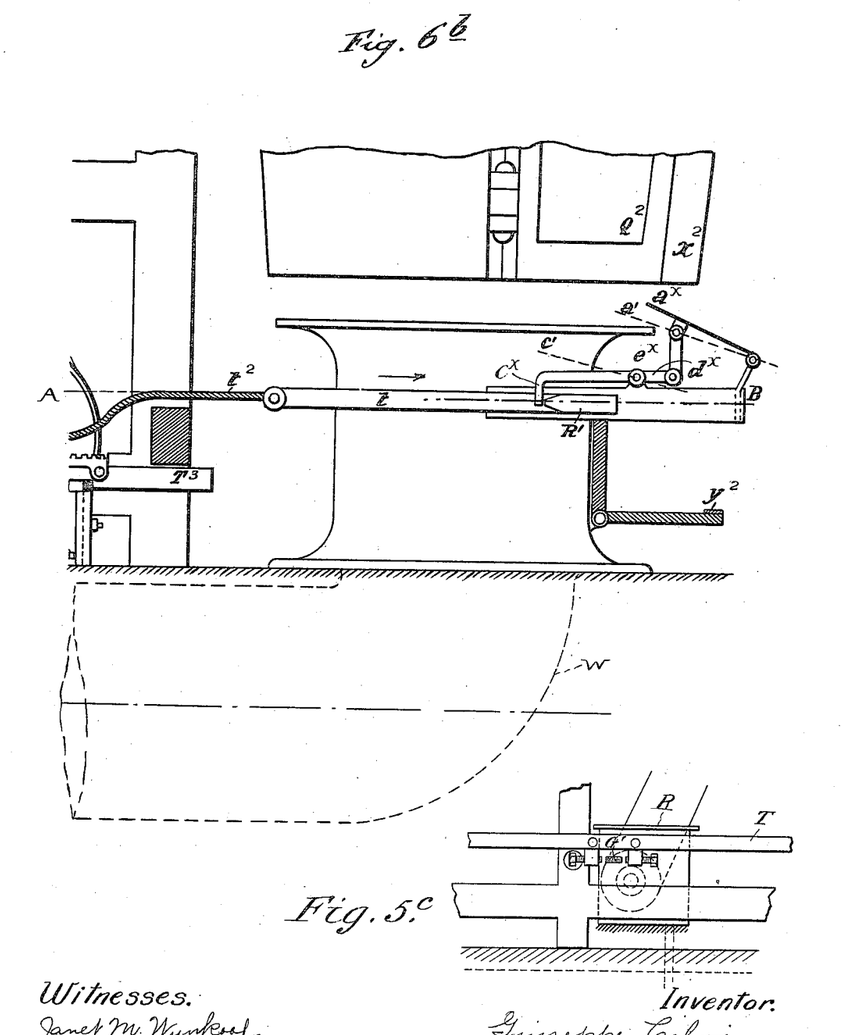
Figure 6A:
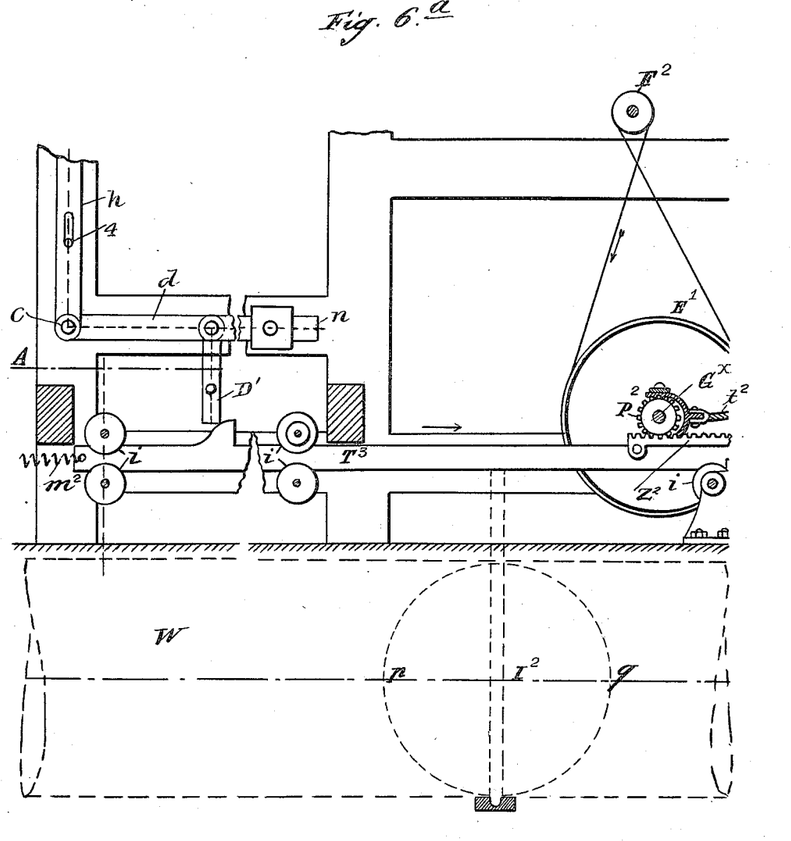

In the modified construction shown in Figs. 6$^a$, 6$^b$, 7$^a$, 7$^b$ the first two of which relates to the position in which the valve I$^2$ is open and the last two to that in which it is closed, the method of controlling the rod T$^3$ is different. The spindle G$^×$ (Fig. 7$^a$) is driven by the pulleys F$^2$, E$^1$ with continuous rotation and it carries a clutch H. This clutch is in a disengaged position when the lever $d^×$ pivoted at $c^×$ is in the position shown in Figs. 6$^a$ and 6$^b$ which show it with its end $c^×$ engaging with the member R$^1$ of the tie rod $t$ $t^2$ fulcrumed at $c^2$ to lever $f^×$.

Figure 7:
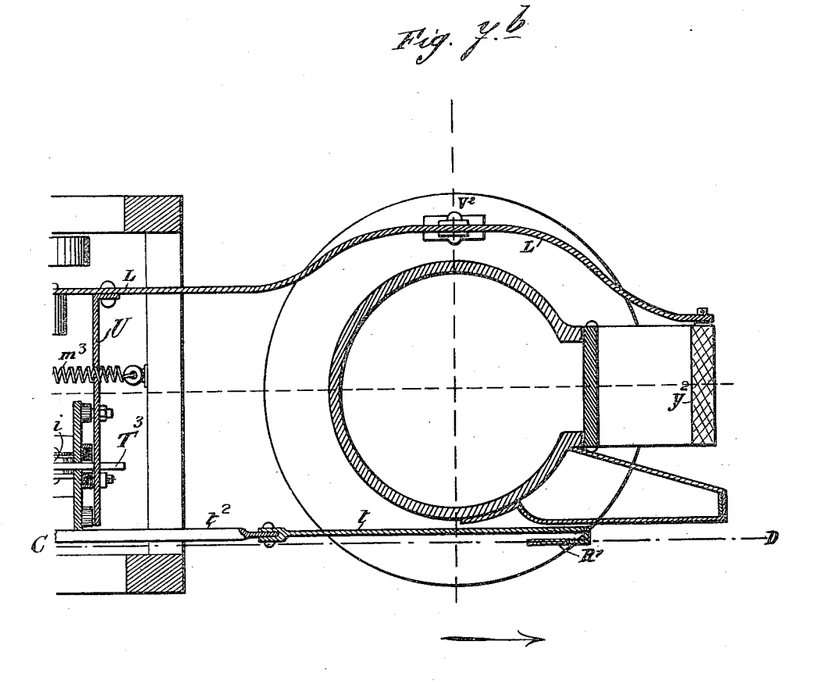
Figure 7A:
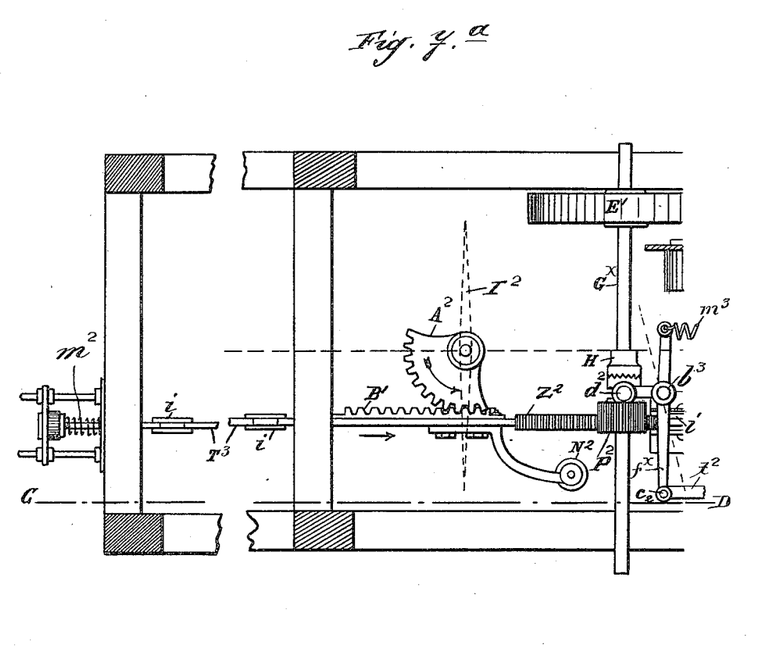

The result of this is that the lever $f^x$ pivoted at $b^3$ is held in the open position. In that position, the arm $d^2$ of the lever $f^x$ opens the clutch and the spindle $G^x$ is rotating idly and no movement is transmitted to the rod $T^3$.

When the workman introduces the cone which is to be covered with hairs into the chamber $Q^2$ (Figs. 6ª and 6ᵇ) he presses for an instant on the treadle $a^x$ which moves the member $c^x$ out of engagement with the member $R^1$ and consequently the rod $t$ is free to obey the spring $m^3$. The lever $f^x$ then moves actuated by spring $m^3$ from the open to the closed position Fig. 7ª and the clutch H is again brought into engagement. The pinion $p^2$ is rotated and drives the tooth rack $Z^2$ secured to the rod $T^3$. The latter moves forward in the direction of the arrow, sliding on rollers $i$ and acts in its turn by means of the tooth rack $B^1$ on the sector $A^2$ which brings the valve $I^2$ from the closed position into the open position. As soon as the valve $I^2$ has come into the open position, the rod $T^3$ must be stopped. In order to accomplish this, when the rod $T^3$ arrives at the end of its travel, an arm $N^2$ secured to the rod $T^3$, strikes lever $f^x$ and thus throws out of gear the clutch H. The said movement of the lever $f^x$ forces the tie rod $t$ $t^2$ to move forward (in the direction of the arrow) which results in the end $c^x$ of the lever $d^x$ coming into engagement again with the member $R^1$ which resumes its stopping position.

Figure 8:
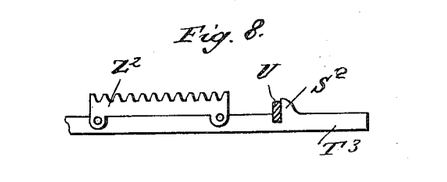
Fig. 8 being a detail view of Fig. 7$^a$.

The closing of the valve must take place as described with reference to Figs. 1 to 5 when the workman, after having sprinkled the felting, wishes to prevent excessively quick evaporation. In the construction shown in Figs 6ª and 7ª, the object in question is attained in the following manner: The workman depresses with his foot the pedal $y^2$ which, by means of the lever L pivoted about $V^2$ raises the arm U which is in engagement with the tooth $S^2$ with which the rod $T^3$ (Fig. 8) is provided. The rod $T^3$ is then free to follow the action of the spring $m^2$ and returns, that is to say, moves in the direction opposite to that of the arrow, the result of which is to turn the sector $A^2$ and to bring the valve $I^2$ into its closing position.

I claim:

1. The combination with a felting machine having a suction chamber, a conveyer, a cone mounted within the suction chamber and a valve controlling the suction within the chamber, a gearing means for actuating said valve comprising a driving gear, a driven gear and a weight; means for constantly rotating the driving gear, a device for effecting engagement and disengagement of said valve gearing, separate members for operating said device for effecting engagement and disengagement of said gears, said members being each manually actuated.

2. The combination with a felting machine having a suction chamber, a cone mounted within the suction chamber, a flue leading from said chamber, a valve in the flue, and means for creating suction in said flue, and a conveyer for simultaneously delivering material to the cone; of a valve actuating mechanism comprising a driven gear mounted on the valve shaft, a driving gear adapted to mesh with said driven gear and also adapted to be constantly rotated through the medium of the material conveyer mechanism, and a weight connected with said driven gear adapted to act in opposition to said driving gear; a device for effecting engagement and disengagement of said valve actuating gears, whereby to open and to close the valve, and separate members for operating the device in effecting engagement and disengagement, said members being each manually actuated.

3. The combination with a felting machine having a suction chamber, a cone mounted within the suction chamber, and a door for said chamber, a flue leading therefrom, a valve in said flue and operative connections for said valve, a conveyer for delivering material to the cone, and means for creating air suction within said flue, of a lever mechanism connected with said door and adapted to open said valve within said chamber on the closing of said door, intermediate gearing between said mechanism and said conveyer whereby said conveyer is started on said intermediate gearing being actuated by said mechanism simultaneously with the starting of the air suction in said chamber.

4. The combination with a felting machine having a suction chamber, a cone mounted within the suction chamber and a closure for said chamber, a flue leading from said chamber, a valve in said flue, a conveyer for delivering material to said cone, and means for creating air suction within said flue; of a controlling mechanism comprising a lever adapted to effect the starting and stopping of the conveyer, a slide rod adapted to engage said lever and to hold it in open position, a reciprocating bar adapted to engage with and actuate the slide rod and a valve operating mechanism; said reciprocating bar adapted to actuate said valve through said mechanism.

5. The combination with a felting machine having a suction chamber, a cone mounted within the suction chamber and a closure for said chamber, a flue leading from said chamber, a valve in said flue, a conveyer for delivering material to said cone, and means for creating air suction within said flue; of a controlling mechanism, comprising a lever adapted to effect the starting and stopping of the conveyer, a slide rod adapted to engage said lever and to hold it in open position, a reciprocating bar adapted to engage with and actuate said slide rod, and also to actuate said valve in said flue by means of a connecting mechanism, separate means for withholding and actuating said reciprocating bar to close the valve, and a lever mechanism operatable upon the closing of said door for actuating said reciprocating bar to open the valve and to release the conveyer controlling lever.

6. The combination with a felting machine having a suction chamber, a cone mounted within the suction chamber and a closure for said chamber, a flue leading from said chamber, a valve in said flue, a conveyer for delivering material to said cone, and means for creating air suction within said flue; of common driving means for said valve and said conveyer, a clutch for said conveyer and a connecting device for said valve, a controlling mechanism, comprising a hand lever for said clutch, a spring for actuating said hand lever, a vertical slide rod adapted to hold said lever in open position, an oscillating arm hinged to said slide rod, a spring actuated reciprocating bar, a one-way engaging device between said arm and said reciprocating bar, an oscillating lever having linked connection with said reciprocating bar; a treadle mechanism adapted to retain said reciprocating bar in one position whereby, on the closing of said door, said controlling mechanism will simultaneously open said valve in said flue and start said conveyer, and whereby in operating said treadle mechanism when said door is open, the air suction in the flue will be cut off, and by turning said hand lever the conveyer will be stopped.

Signed at Turin, Italy, this 12th day of November 1908.

GIUSEPPE CALVI.

Witnesses:
  GOVEZH FRANCISCO,
  ARNALDO ZEPPEYNO.

---

Copies of this patent may be obtained for five cents each, by addressing the "Commissioner of Patents, Washington, D. C."